United States Patent [19]

Iverson et al.

[11] Patent Number: 5,581,694
[45] Date of Patent: Dec. 3, 1996

[54] METHOD OF TESTING AND PREDICTING FAILURES OF ELECTRONIC MECHANICAL SYSTEMS

[75] Inventors: David L. Iverson, Sunnyvale; Frances A. Patterson-Hine, Mountain View, both of Calif.

[73] Assignee: The United States of America as represented by the Administrator of the National Aeronautics and Space Administration, Washington, D.C.

[21] Appl. No.: 332,198

[22] Filed: Oct. 17, 1994

[51] Int. Cl.⁶ .................................................. G06F 11/34
[52] U.S. Cl. .................................. 395/183.02; 395/62
[58] Field of Search .................. 395/183.02, 183.13, 395/183.15, 62, 63, 65

[56] References Cited

U.S. PATENT DOCUMENTS

| | | | |
|---|---|---|---|
| 4,964,125 | 10/1990 | Kim | 395/183.02 |
| 4,967,337 | 10/1990 | English et al. | 395/183.02 |
| 5,127,005 | 6/1992 | Oda et al. | 395/183.02 |
| 5,272,704 | 12/1993 | Tong et al. | 395/183.02 |
| 5,297,150 | 3/1994 | Clark | 395/183.02 |
| 5,418,889 | 5/1995 | Ito | 395/75 |

*Primary Examiner*—Robert W. Beausoliel, Jr.
*Assistant Examiner*—Trinh L. Tu

[57] ABSTRACT

A method employing a knowledge base of human expertise comprising a reliability model analysis implemented for diagnostic routines is disclosed. The reliability analysis comprises digraph models that determine target events created by hardware failures human actions, and other factors affecting the system operation. The reliability analysis contains a wealth of human expertise information that is used to build automatic diagnostic routines and which provides a knowledge base that can be used to solve other artificial intelligence problems.

4 Claims, 5 Drawing Sheets

METHOD OF TESTING AND PREDICTING FAILURES OF ELECTRONIC MECHANICAL SYSTEMS

ORIGIN OF THE DISCLOSURE

The invention described herein was made by an employee of the National Aeronautics and Space Administration and it may be manufactured and used by and for the United States Government for governmental purposes without the payment of royalties thereon or therefor.

BACKGROUND OF THE INVENTION

A. Technical Field of Field of the Invention

The present invention relates to a method for testing and predicting failures of an electronic system, and more particularly, to a method that provides a knowledge base based on human expertise and comprising digraph models all used for analyzing faults in complex systems.

B. Description of the Prior Art

Reliability models are commonly derived during the inception of an electronic system, especially if such an electronic system is complex and susceptive to having a single failure render the system inoperative. Reliability models take into account various parameters, such as the failure rate of the individual components and the interrelationship of the components making up the system. The reliability models are commonly implemented to be used in failure mode analysis of systems and one such usage described in U.S. Pat. No. 5,014,220, of C. M. McMann, herein incorporated by reference.

Reliability analysis, such as failure mode effects analysis (FMEA), fault tree or digraphs analysis, are performed on many systems during their inception stage. Digraph analysis normally consists of digraph models which comprises AND/OR directed graphs with nodes, connected by directed edges, representing hardware failures, human actions, modes of operation, and other factors affecting system operation. The reliability analysis contained in these digraph models, derived during the inception stage of the complex system, comprises a wealth of information that can be used to help build automatic diagnostic systems that service complex electronic systems. A significant amount of effort can be saved by using reliability analysis information inherent in the digraph models to build a diagnostic system since much of the knowledge or human expertise required for diagnosing a system failure has already been derived to develop the reliability-analysis models.

Digraph models used in reliability analysis have many benefits, one of which is that the models can be derived from system schematics in a fairly straightforward manner by associating a digraph node with each component in the schematic, adding directed edges to represent physically connections between components, and augmenting the basic digraph model with knowledge about component failure modes and rates, and other system design considerations, such as fault tolerant features provided by redundant components or duplicate subsystems. A further discussion of digraph modeling may be found in the technical article entitled *Digraph Matrix Analysis* of Ivan J. Sacks, published in the IEEE Transactions on Reliability, Vol. R-34, No. 5, pp. 437–445, December, 1985. A still further discussion of digraph modeling is described in the technical article entitled *Automatic Translation of Digraph to Fault-Tree Models* of D. L. Iverson, published in the Proceedings of the Annual Reliability and Maintainability Symposium of the IEEE, New York-Las Vegas, Nev., USA, January, 1992, pp. 354–362.

Although the digraph models serve well their intended function in reliability analysis, as well as being used in diagnostic fault isolation techniques, digraph modeling applications are somewhat limited when the associated nodes (possible failures) in a sophisticated system being analyzed, reaches into the thousands, e.g., greater than 1,000. For example, using the computing techniques described in the above two technical articles of Sachs and Iverson, when the system involves nodes of about 1100, about 3400, and about 7000, the processing time involved with computer workstations yielding a solution of the related digraph models respectively is about 12 minutes, 42 hours, and four days. It is desired that means be provided to allow digraph models to be used for reliability and diagnostic analysis of complex electronic systems, yet provide a solution therefor within a relatively short operational time, such as seconds or minutes and not hours and days.

Accordingly, it is a principal object of the present invention to provide reliability and diagnostic analysis using digraph models and unique techniques and, more importantly, to a method which substantially reduces the time required to derive a solution thereof.

It is another object of the present invention to provide digraph techniques which incorporate human expertise so as to derive a knowledge base that can be used for various artificial intelligent applications to solve associated problems.

A further object of the present invention is to provide a knowledge base incorporating digraph models and techniques that may be used to provide solutions that may be graphically displayed to a user or provided by way of a printout.

SUMMARY OF THE INVENTION

The invention is directed to a method that provides reliability and diagnostic analysis for a complex system by incorporating a knowledge database derived from digraph modeling events. The propagation is determined by executable singletons and doubletons. Each of the nodes, AND gates, and doubletons is assigned an individual object separately located in memory. The failure signals are classified as being one of a singleton and doubleton and a singleton and doubleton failure signal is generated therefor. The singleton failure signals are identified with its respective node and such identification is delivered to the respective object in memory. The identification step of the singleton further includes the monitoring for the generation of a respective target event associated with the singleton failure signal. A further sequential identification step is performed to identify the doubleton failure generated signal with its respective object as well as with its own identified node and delivers both identifications to their respective objects, while also monitoring for the occurrence of any target event.

DETAILED DESCRIPTION OF THE INVENTION

Figure 1:
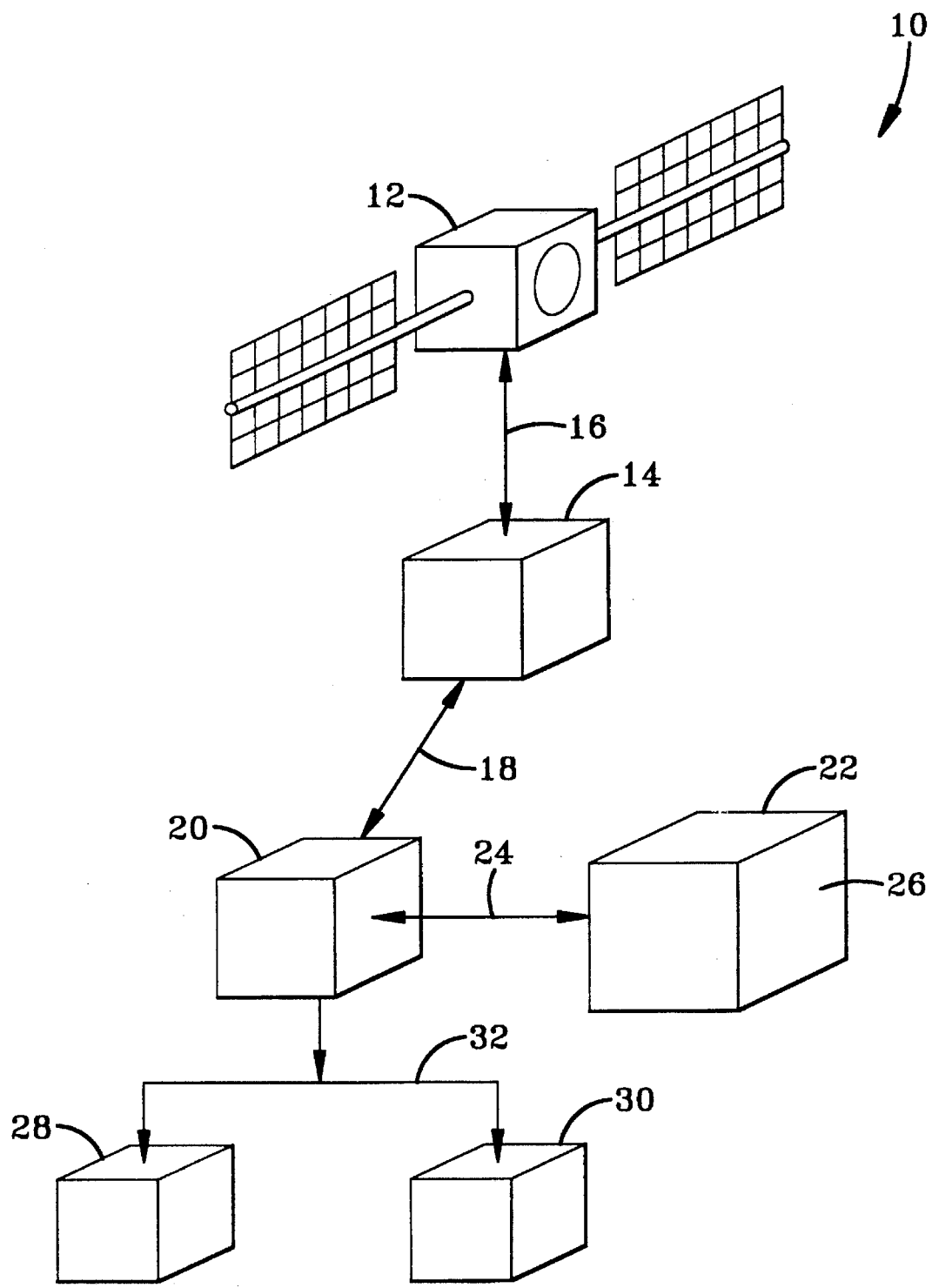
FIG. 1 is a schematic view showing the interrelationship of a space station and its monitoring and diagnostic equipment containing the knowledge base of the present invention.

Referring now to the drawings, wherein the same reference techniques that yields a relatively rapid solution of a problem associated with a failure of the complex system.

The present invention provides a method of testing and predicting failures of an electronic system comprising a plurality of units. The method comprises the steps of receiving, analyzing, directing, classifying and two sequential steps of identifying. The method of the present invention receives data samples indicative of the operating status of each of the plurality of units making up the system. The method analyzes the data samples to determine the presence of any failures of any of the plurality of units and generates a corresponding failure signal therefor. The failure signals are directed to a digital computer having a memory for storing a knowledge base having a data structure with objects separately stored in memory and each object having a plurality of slots. The data structure has encapsulation, inheritance and polymorphism characteristics and comprises a digraph model that determines predetermined target events. The digraph model comprises nodes and AND gates that are interconnected by directed edges. Each of the nodes is assigned to a particular unit and corresponds to a failure of that assigned unit, and each of the AND gates is related to redundant units or dual-failure paths of the system and has a plurality of inputs each assigned to a particular node designated for the particular failure thereof. The nodes and AND gates are connected by the directed edges so that propagation therebetween and exit therefrom determines the target numbers indicate the same elements, there is shown in FIG. 1 a system 10 associated with the monitoring and analyzing of a complex system 12, such as that that may be found in a space station 12 or any other sophisticated electrical equipment, wherein fault analyzing and fault localizing operations are desired. Communication between the space station 12 and a ground station 14 is commonly established by communication link 16, typically transmitting telemetry information. The ground station 14 communicates, by means of a digital link 18, with a digital computer 20. Computer 20 may be of any suitable type, such as a SUN SPARC workstation from Sun Microsystems, Inc., of Mountain View, Calif. Computer 20 is interconnected to a memory 22 by way of a digital link 24. The memory 22 stores a data base 26, commonly referred to in artificial intelligent applications related to the present invention as being a "knowledge base" which is derived from human expertise. The computer 20 is also interconnected to both a graphic display 28 and to a printer 30 both by way of digital communication link 32.

Sophisticated systems, such as a space station 12, almost always require reliability analysis be performed at their inception. Reliability analysis can be defined as the analysis of events that contribute to the occurrence of undesirable conditions, and the application of probability theory to determine that the likelihood of these undesirable conditions falls within acceptable limits. In other words, reliability analysis provides a statistical basis for making decisions as to the relative safety or usefulness of a particular device or system.

Reliability analysis is especially important in complex systems, such as the space station 12, having flight control systems, wherein a failure of a particular component or subsystem could cause a failure of a mission. As systems have become more and more sophisticated, digital systems and redundancy management schemes, such as backup equipment that provides for a certain degree of fault tolerance, have been implemented to satisfy the system requirements. The digital systems and redundant equipment have advantageously provided high performance, but relatively complex systems, requiring comprehesive reliability analysis of each component that makes up the system. This reliability analysis has become tedious, and time consuming. However, these reliability analyses contain a wealth of information that can be used to help to build automatic diagnostic systems for servicing the complex systems, since much of the knowledge required for diagnosing system problems has already been uncovered by the reliability engineers that derive the reliability analysis at the inception of the complex systems.

The reliability and diagnostic analyses performed for complex systems should take into account the architecture of the system itself. For example, a system may be sub-divided into subsystems that correspond to a power supply subsystem, a telemetry/command subsystem, an attitude orbit control system, a propulsion subsystem or a heat control subsystem. Further, each subsystem may be sub-divided into devices that make up the subsystem, for example, primary and backup pumps for a cooling system. Further, the devices themselves may be further sub-divided into parts, such as sensors for sensing the operating conditions of the primary and backup pumps, a resistor, or a capacitor used in an integrated circuit. Still further, in addition to hardware failures, human actions and modes of operation, as well as other factors of system operation, should be taken into account for the reliability and diagnostic analyses of a complex system. As used herein, the system on which the reliability and diagnostic analyses are being rendered, is considered to comprise a plurality of units, with each unit representing a hardware failure or other actions, including those of humans, that may disadvantageously contribute to the operation or readiness of a complex system.

As discussed in the "Background" section, digraph models may advantageously be used to implement reliability and diagnostic analyses. The digraph technique employs AND-OR directed graphs with nodes, connected by directed edges, representing hardware failures each associated with a particular unit of the system, human actions, modes of operation and other factors affecting system operation. The redundancies of units within the system is represented by digraph AND gates. The digraph directed edges represent connectivity, such as physical connections between node or AND gates or functional dependency. The digraph directed edges also provide paths wherein a failure represented by a given node could propagate through the directed edges and cause other failures represented by nodes in the propagation path. Propagation through the nodes is unrestricted and not dependent on transient conditions.

A common operation performed on digraph models is a calculation of single failures or pairs of failures that could cause a given target event of the digraph model to occur. For example, a calculation or solution may be performed and uncover that a single failure (e.g., loss of coolant) could cause a predetermined target event (e.g., loss of the coolant unit). A target event may be any representation of the digraph model that signifies the occurrence of the particular conditions, such as the failure of a particular unit that may render the complete system inoperative. If a given failure causes a target failure event, that failure is identified a singleton of that target event. If two failures combine, via a digraph AND gate, to cause a target event, those two failures are identified a doubleton of that target event. Finding singletons and doubletons for a digraph model is useful for finding or solving for weak links in the system (such as a single point failure) and for calculating quantitative values for system reliability.

The present invention uses the singleton and doubleton solutions to provide for system diagnostics since these solutions represent possible causes for the failure or target events of the digraph models. The present invention not only solves for singletons and doubletons of all nodes derived from the digraph models but, unlike the prior art system and techniques related to digraph modeling discussed in the "Background" section, provides for a relatively rapid response time. The present invention improves the response time by efficiently utilizing a knowledge base 26 derived from the human expertise, more than likely developed by deriving reliability analysis at the inception of the complex system, such as the space station 12. The knowledge base 26 has a data structure with objects having a plurality of slots and which objects are separately stored in the memory. The data structure has encapsulation, inheritance and polymorphism characteristics related to object-oriented program techniques that can be implemented by C programming language. More particularly, encapsulation is a characteristic that makes the data and processing private in that it allows the data and processing being performed for an object to be modified without causing any disruption to other operations being performed elsewhere in a computer, such as computer 20 of FIG. 1. Inheritance is a characteristic that manifests the ability of one object (sometimes called a lower object) to inherit properties from a higher object. Polymorphism is the characteristic that manifests the ability of a generated request (message) to produce different results based upon the object that the request is sent to.

The digraph modeling of the present invention that utilizes encapsulation, inheritance, and polymorphism characteristics are graphical combinational failure models comprising nodes and AND gates connected by directed edges and may be further described with reference to FIG. 2 and with reference to Table 1 listing the nodes, AND gates and directed edges shown in FIG. 2.

TABLE 1

| REFERENCE NO. | TYPE OF ELEMENT | APPLICABLE FAILURE EVENT |
|---|---|---|
| 34 | Node | Coolant Reservoir |
| 36 | Node | Coolant Pipes |
| 38 | Node | Primary Pump |
| 40 | Node | Backup Pump |

TABLE 1-continued

| REFERENCE NO. | TYPE OF ELEMENT | APPLICABLE FAILURE EVENT |
|---|---|---|
| 42 | Node | Cooling Unit |
| 44 | AND Gate | — |
| 46 | Directed Edge | — |
| 48 | Directed Edge | — |
| 50 | Directed Edge | — |
| 52 | Directed Edge | — |
| 54 | Directed Edge | — |
| 56 | Directed Edge | — |

Each digraph node, such as nodes 34, 36, 38, 40 and 42, represent a failure in the system 12 of FIG. 1, whereas the directed edges, such as 46, 48, 50, 52, 54 and 56, show how the occurrence of the failures can flow through the system and cause other failures. Each digraph node is assigned to a particular unit of the complex system 12 and, as is to be described, the failure of that unit creates a failure node. As is to be further discussed, if a node is marked as failed, the failure will propagate through all directed edges leading out of that node and mark the nodes connected thereto as failed. Redundancy involved in the digraph modeling of the present invention is taken care of by the use of the digraph AND gates. More particularly, redundant units are represented by two-input AND gates so that both inputs (units or propagation paths) must fail in order for the AND gate to fail (be qualified) and provide an output therefrom. An AND gate ensures that a failure must occur in every input of the AND gate in order to qualify the gate so as to propagate the failure through the output directed edge connected to that failed AND gate. The techniques of the present invention treats all digraph AND gates as having two inputs. If desired, digraph AND gates with more than two inputs can be constructed with combinations of two input AND gates. The digraph nodes can be in one of two states, true or false. If the node is true, or marked, it means that the failure represented by that node corresponding to a particular unit of the complex system 12 has occurred. If the node is false, or not marked, then the failure has not occurred.

Figure 2:
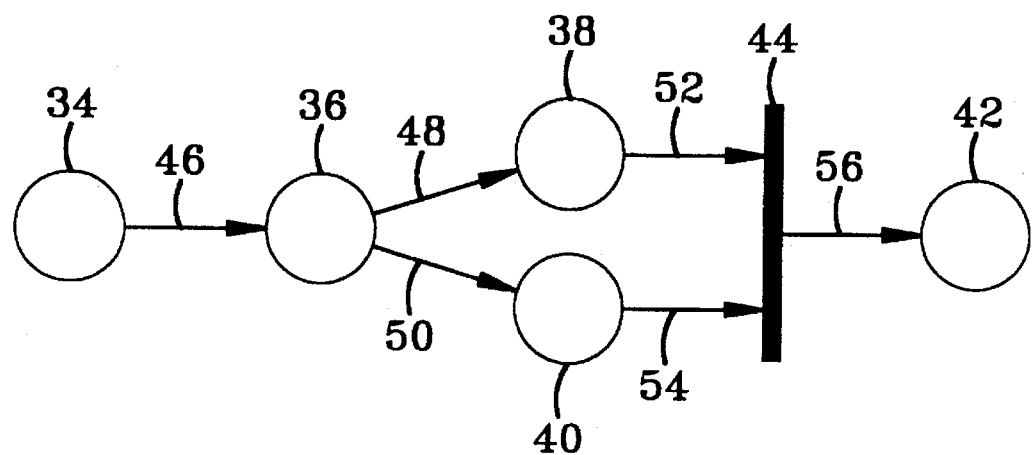
FIG. 2 is an illustration of a segment of a digraph model associated with the present invention.

The digraph configuration of FIG. 2 is for illustration purposes and related to a cooling system, wherein each node (34, 36, 38, 40 and 42) represents a possible failure of a unit of the complex system 12 and the directed edges (46, 48, 50, 52, 54 and 56) correspond to the flow of the coolant failure (node 34-coolant reservoir) through the system. The flow of the coolant failure represents the connectivity (physical connection) between units and the dependency between units. It should be noted that a failure, such as node 34, representative of a coolant reservoir failure, or node 36 representative of coolant pipes failures, could propagate and cause both the primary and backup pumps (nodes 38 and 40) to fail in their function of delivering a coolant to the coolant unit (node 42). The bar 44 in the digraph of FIG. 2, as well as all digraphs related to the present invention, is indicative of an AND gate, such as AND gate 44, which indicates, in FIG. 2, that both the primary (node 38) and backup (node 40) pumps must fail to operate before the coolant unit (node 42) fails due to lack of coolant. Further details of desired nodes may be further described with reference to FIG. 3 which is similar to FIG. 2 except for the additional nodes and directed edges shown in FIG. 3 and given in Table 2.

TABLE 2

| REFERENCE NO. | TYPE OF ELEMENT | TYPICAL FAILURE ELEMENT |
| --- | --- | --- |
| 58 | Node | Low Reservoir Level |
| 60 | Node | Low Primary Pump Output Pressure |
| 62 | Node | Low Backup Pump Output Pressure |
| 64 | Node | High Coolant Unit Ouput Temperature |
| 66 | Directed Edge | — |
| 68 | Directed Edge | — |
| 70 | Directed Edge | — |
| 72 | Directed Edge | — |

Figure 3:
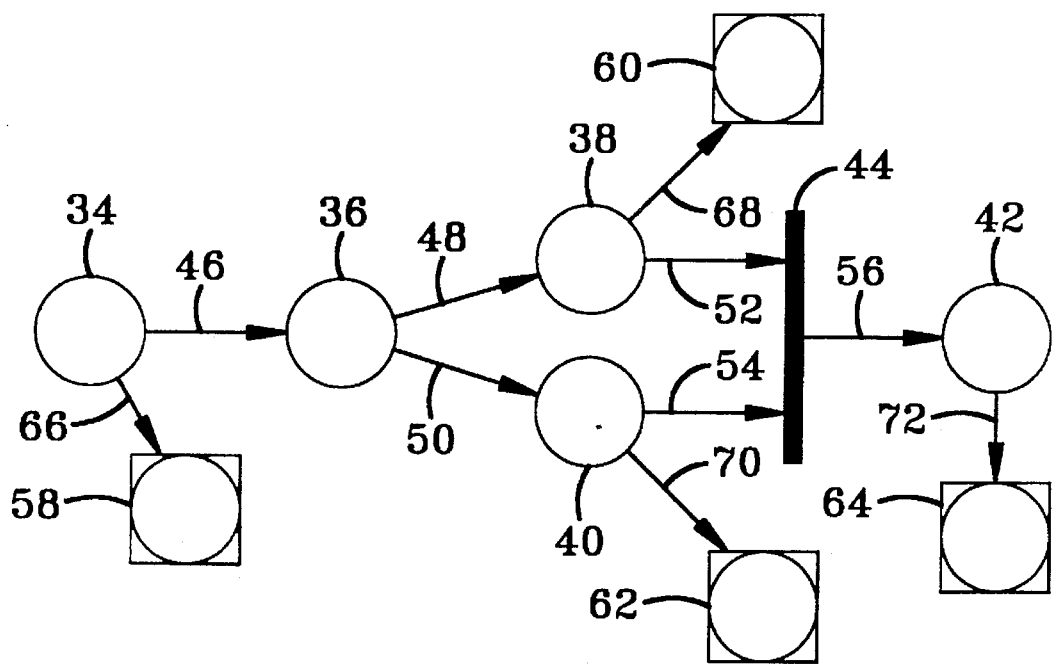
FIG. 3 illustrates further details of the segment of the digraph model of FIG. 2.

The primary difference between FIG. 2 and FIG. 3 is the addition to FIG. 3 of sensor nodes 58, 60, 62 and 64 each of which represent a failure and for the embodiment of FIG. 3 represent a respective failure for the cooling equipment for the complex system 12 of FIG. 1. In other embodiments, the failure nodes of both FIGS. 2 and 3 may represent the failure signatures of other units of the complex system 12 that may be correlated to telemetry quantities transmitted by the complex system 12 by way of the communication link 16 shown in FIG. 1.

The method of the present invention may be implemented by the use of object-oriented programming techniques having classes, commonly referred to as objects. The digraph modeling of the present invention may be implemented using these objects thereof which are self-contained modules of data and associated processing. Furthermore, the method of the present invention implements the advantageous encapsulation, inheritance and polymorphism characteristics so as to provide a solution pin pointing a failure of a unit within the complex system in minutes or seconds not days or hours. The method of the present invention uses objects as the storage medium of failure set solutions and partial solutions which objects may be further described with reference to FIG. 4 which comprises FIGS. 4(A), 4(B) and 4(C), respectively indicating a digraph node object, a digraph AND gate object, and a digraph doubleton object whose memory contents are respectively and generally indicated as 74, 76 and 78.

Figure 4A:
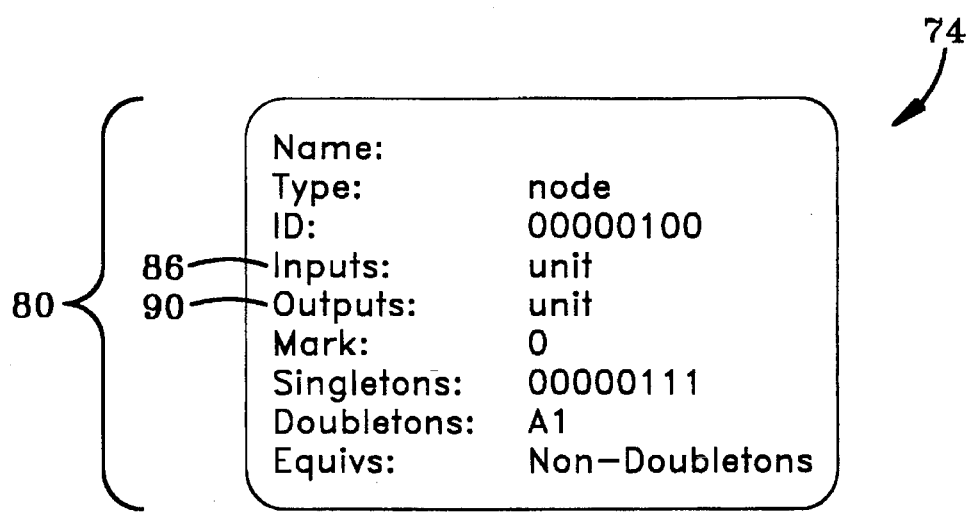
FIG. 4 is composed of FIGS. 4(A), 4(B) and 4(C) respectively illustrating a digraph node object, a digraph AND gate object and a doubleton object, all associated with the method of operation of the present invention.
Figure 4B:
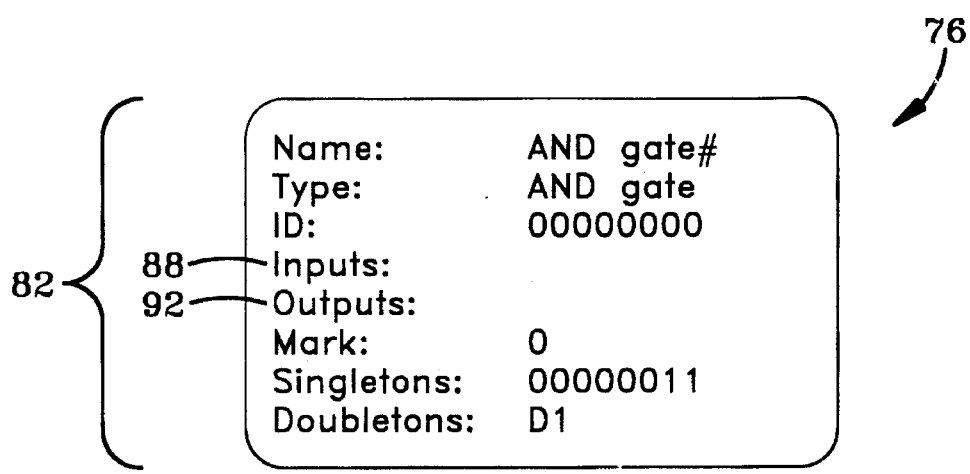
Figure 4C:
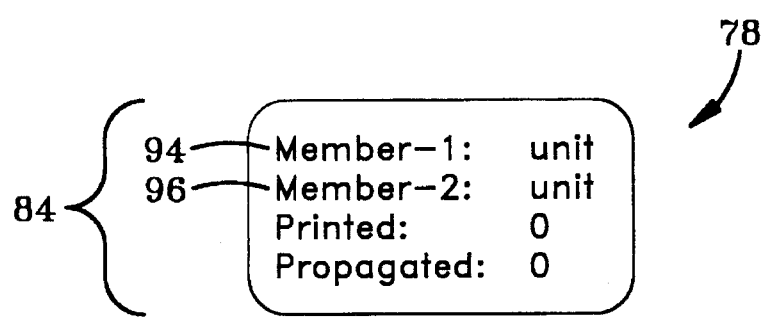

Each of the digraph node, AND gate and doubleton objects of FIG. 4 are separately stored in memory, in particular, separately stored in the knowledge base 26 which, in turn, is stored and accessible in the memory 22 of the computer 20 shown in FIG. 1. Further, each of the objects of FIG. 4 has a plurality of slots (80, 82 and 84 of FIGS. 4(A), 4(B) and 4(C) respectively) for storing status information, e.g., connectivity and solution information. For example, the objects of FIGS. 4(A) and 4(B) have at least 8 slots such as name type identification (ID), inputs (86 of FIG. 4(A) and 88 of FIG. 4(B)), outputs (90 of FIG. 4(A) and 92 of FIG. 4(B)), mark, singletons and doubletons, and the digraph node object of FIG. 4(A) further has a slot of equivs. Connectivity information of the slots of FIG. 4(A) and 4(B) primarily comprise the input and output slots thereof generally classified therein as UNIT associated with the failure equipment or incorrect operation of such. For example, and with reference to FIG. 2, the digraph AND gate object of FIG. 4(B) may have a name of AND gate No. 1 and to which are connected, to its two inputs, the failure occurrences of the unit's primary pump (node 38) and backup pump (node 40) and from which its output slot is connected, via its directed edge, to the node cooling unit (node 42).

The mark slot of FIGS. 4(A) and 4(B) is used to indicate if a failure has propagated to the particular node. The input and output slots of the objects of FIG. 4(A) and 4(B) contain lists of pointers (sometimes referred to as "linked lists") to digraph objects representing nodes and AND gates that are directly connected to the particular node. The singletons slot of FIGS. 4(A) and 4(B) contains a representation of the node ID's of the singletons of the node. The doubleton slot of FIGS. 4(A) and 4(B) contains a list of pointers to doubleton objects, such as illustrated in FIG. 4(C). The doubleton objects of FIG. 4(C) contain slots pointing to each doubleton members indicated by reference numbers 94 and 96 and associated with a respective node object and flags (printed and propagated) to indicate if the doubleton has been printed or processed. More particularly, as seen in FIG. 4(C), the doubleton objects have member 1 and member 2 slots which make up the doubleton and which specify the node (UNIT) of the associated members.

Calculating Singletons

The present invention calculates or solves for singletons and doubletons by using a herein termed "source operation." In general, in a source operation, a digraph node is marked as failed and that mark is propagated through the digraph's directed edges (output slots) to determine which other nodes will fail. When a digraph node is marked, the mark will propagate to all the outputs (output slots) of the failed digraph node object. If the mark reaches an AND gate, in particular a digraph AND gate object, all the input nodes of the AND gate must be marked (failed) in order for the mark to propagate to the outputs (output slots) of the digraph AND gate object. This is the same as the operation of an ordinary logic AND gate that delivers an output signal only when all of several input signals occur simultaneously.

The method of the present invention uses the mark slot in each digraph object (node, AND gate and doubleton) to perform the source operation. If a digraph node object is marked or if a digraph AND gate object is marked, the mark slot in the respective object is set to true (1), otherwise the mark slot is set to false (0). When a digraph node object or digraph AND gate object is set to true, the mark propagates through all the respective outputs by way of the associated directed edges to adjacent nodes. If the mark reaches a node that is already marked, the mark does not propagate any further. This prevents the method of the present invention from entering an infinite loop.

A straightforward technique for calculating singletons is to perform a source operation for each node in the digraph model and add the sourced node as a singleton slot (see FIGS. 4(A) and 4(B)) of every digraph node object, including the digraph AND gate object, that the mark reaches. All marked nodes are reset to false (0) after each source operation so that stray marks do not corrupt the next singleton operation.

Doubleton Candidates and Equivalent Nodes

Figure 5:
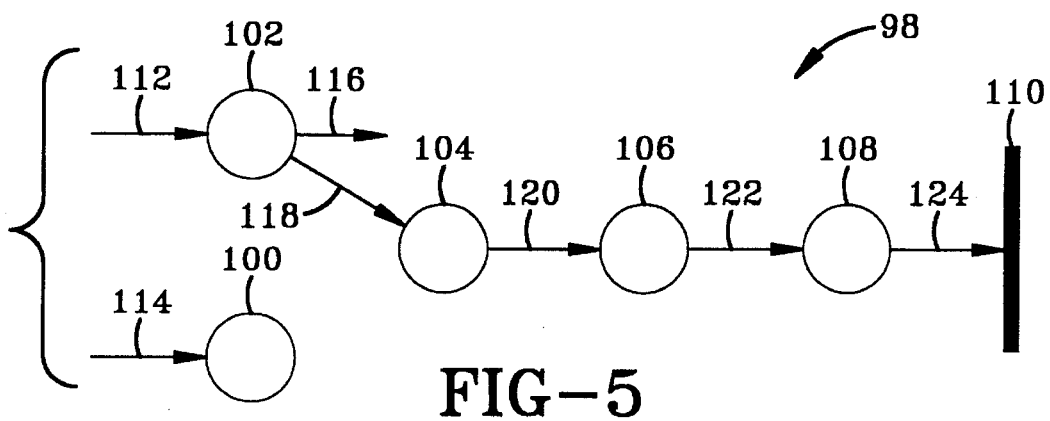
FIG. 5 illustrates a series of equivalent digraph nodes.

The knowledge base 26 of the present invention comprising the digraph model constructed by human expertise may contain a series of connected nodes that all, or substantially all, reach one output such as that illustrated in FIG. 5 as an arrangement 98 having the nodes, AND gates and directed edges all given in Table 3.

TABLE 3

| REFERENCE NO. | ELEMENT |
| --- | --- |
| 100 | Node |
| 102 | Node |
| 104 | Node |
| 106 | Node |

TABLE 3-continued

| REFERENCE NO. | ELEMENT |
| --- | --- |
| 108 | Node |
| 110 | AND Gate |
| 112 | Directed Edge |
| 114 | Directed Edge |
| 116 | Directed Edge |
| 118 | Directed Edge |
| 120 | Directed Edge |
| 122 | Directed Edge |
| 124 | Directed Edge |

The series of nodes that has input and output directed edges arranged as illustrated in FIG. 5 can terminate at a node (100) with no outputs, a node (102) with more than one output, or a node (108) that is an input to an AND gate (110). When sourced, that is, when a source operation is performed, each node in the series (except for node 100 having no output and node 102, in particular, the output thereof indicated by directed edge 116) will reach the same digraph nodes outside of the series as the other nodes in the series. For digraph evaluation purposes, related to the method of the present invention, it is assumed, and without any high risk therefor, that all of the nodes (except for those already specified) in the series and the terminating nodes are equivalent and reach the same nodes when sourced. This assumption allows for the saving of processing time (in addition to the saving provided by the encapsulation, inheritance and polymorphorism characteristics) by performing a sourcing operation only on the terminating node of each series, instead of each node in the series, when calculating singletons and doubletons. If the terminating node becomes a singleton or part of the doubleton of another node, then all the other nodes in the series are a singleton or part of a doubleton of that node. For example, if node 108 of FIG. 5 becomes a singleton or part of a doubleton (such as shown in FIG. 5 as having its directed edge 124 as an input to the digraph AND gate object 110), then all the equivalent nodes, such as 104 and 106, are classified as a singleton or part of a doubleton respectively. The present invention uses the equivalent node principles extensively since, in the practice of the present invention, a great share of its processing time is associated with nodes that have more than one output or that have an AND gate as an output, that is, its directed edge propagates to a digraph AND gate object. These series of equivalent nodes, such as that illustrated in FIG. 5, are usually terminated by this type, that is, an AND gate that receives the directed edge of the failed node or a node with multiple outputs (such as node 102). These nodes, that is, one that has an AND gate as an output, are herein termed "doubleton candidates" since they are the only nodes that are processed during doubleton calculations to be described.

Further Considerations for Solving Singletons

When the method of the present invention solves for singletons, the method does not propagate every node through the entire digraph model. Rather, only doubleton candidates are propagated exhaustively through every connected node in the digraph model. Nodes that are not doubleton candidates (single outputs in an equivalent series such as nodes 104 and 106 illustrated in FIG. 5) only propagate to the terminating node (e.g., 108 of FIG. 5) of the series. This terminating node (e.g., 108 of FIG. 5) is either a doubleton candidate (e.g., as seen in FIG. 5 node 108 has its output applied to an AND gate 110), or a node with no outputs. As the non-doubleton candidate nodes (e.g., nodes 104 and 106 of FIG. 5) propagate, they are added to a list in the equiv slot (see FIG. 4(A)) in each digraph node object that they reach. With this scheme of only propagating doubleton candidates, each of the singletons that reach a node represents the singleton node itself and all of its equivalents.

Digraph Doubletons

A doubleton for a node used in digraph models, such as the present invention illustrated in FIG. 4(C) for digraph doubleton object representation, is a pair of nodes with the property that if both nodes are sourced (i.e., both failure represented by the respective nodes occurred concurrently), then the mark (or failure) will propagate to the target node interchangeably referred to herein as target event. For example, with reference back to FIG. 2, when failures as represented by nodes 38 and 40 (primary pump and backup pump, respectively) occur, then the represented failure will propagate to the target node 42 (cooling unit). The set of doubletons (e.g., nodes 38 and 40) for the target node (42) will consist of all pairs of nodes that when sourced would include at least one singleton (e.g., coolant reservoir node 34 of FIG. 2), of a target node (e.g., node 42 of FIG. 2) and all pairs of that node, when sourced, would mark a digraph AND gate object (e.g., AND gate 44 of FIG. 2) that is directly upstream of the target node (42). A node, for example node A, is considered to be "upstream" of a node, for example node B, if you can trace a path from node B to node A through the digraph edges in the opposite direction of the directed edge arrows. Similarly, node B is downstream of node A if you can trace a path from node A to node B following the directed edges in the direction of the arrows. A digraph AND gate object used in the present invention is considered to be "directly upstream" of a node if you can trace a path from the digraph AND gate object to the node, in the direction of the directed edge arrows, without passing through another digraph AND gate object. The present invention only solves for doubletons that mark a digraph AND gate object directly upstream of the target node. Some of the doubletons may include singletons of the target node as doubleton members (see FIG. 4(C) member slots 94 and 96).

Since the digraph techniques of the method of the present invention define doubletons for a node as the doubletons that would mark a digraph AND gate object directly upstream of the node, it is only necessary to solve for these defined doubletons of the digraph AND gate objects in the digraph model. To find the doubletons for a given node, (see FIG. 4(A)) one finds the doubletons for all the digraph AND gate objects directly upstream of that given node. To locate the AND gates directly upstream of that given node, or any node, the digraph techniques of the present invention perform a limited source operation on each digraph AND gate object included in the digraph model. In this limited source operation, the generated mark is only allowed to travel, sometimes referred to herein as propagate, to nodes and not through digraph AND gate objects. After the digraph AND gate object has been determined, by the use of the limited source operation, the digraph AND gate object is added to the upstream_ands list in each node that the mark reached, as to be further described hereinafter with reference to FIG. 8. The upstream_ands is stored in a slot in each digraph node object, in particular in a node set out for a predetermined target event. Also, each node that the digraph AND gate object's mark reached which has a digraph AND gate object as an output, is stored in the downstream_andins slot of the limited source digraph AND gate object. For such processing, the method of the present invention advantageously skips over nodes between these specified digraph AND gate objects when solving for doubletons.

Calculating Digraph Doubletons

Figure 6:
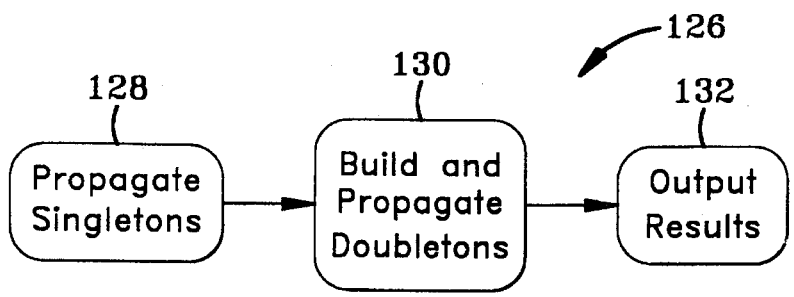
FIG. 6 illustrates the sequential singleton and doubleton solutions operations involved with the present invention.

FIG. 6 illustrates a program flow 126 of the method of the present invention that shows the singleton calculations, in particular process segment 128 of propagating singletons, as being performed before the calculations of the doubletons, in particular process segment 130 of building and propagating doubletons, and then shows the results (output results segment 132) of the sequential (singletons and then doubletons) calculations being performed. For each digraph node object that is an input to a digraph AND gate object, the method of the present invention stores a list of the node's singletons in the digraph AND gate object (see FIG. 4(B)) associated with the digraph node object. These singletons are used to build doubletons that are propagated through the digraph model. As previously discussed, only doubleton candidate nodes are propagated through the entire digraph model so the digraph AND gate object singleton list (see FIG. 4(B)) will only contain doubleton candidate nodes. To construct doubletons for a given digraph AND gate object (see FIG. 4(B)), the method of the present invention finds the cross product, sometimes referred to as the cross multiplication (to be further described), of the singletons of each input of the digraph AND gate object (see FIG. 4(B)). Every doubleton formed is represented by an object, as shown in FIG. 4(C). Each doubleton object (see FIG. 4(C)) is unique, so that no two doubleton objects will have the same member slots (see 94 and 96 of FIG. 4(C)). If a doubleton calculation related to a digraph AND gate object produces a doubleton whose object (see FIG. 4(B)) has already been created, the already created doubleton object will be assigned to the digraph AND gate object.

Figure 7:
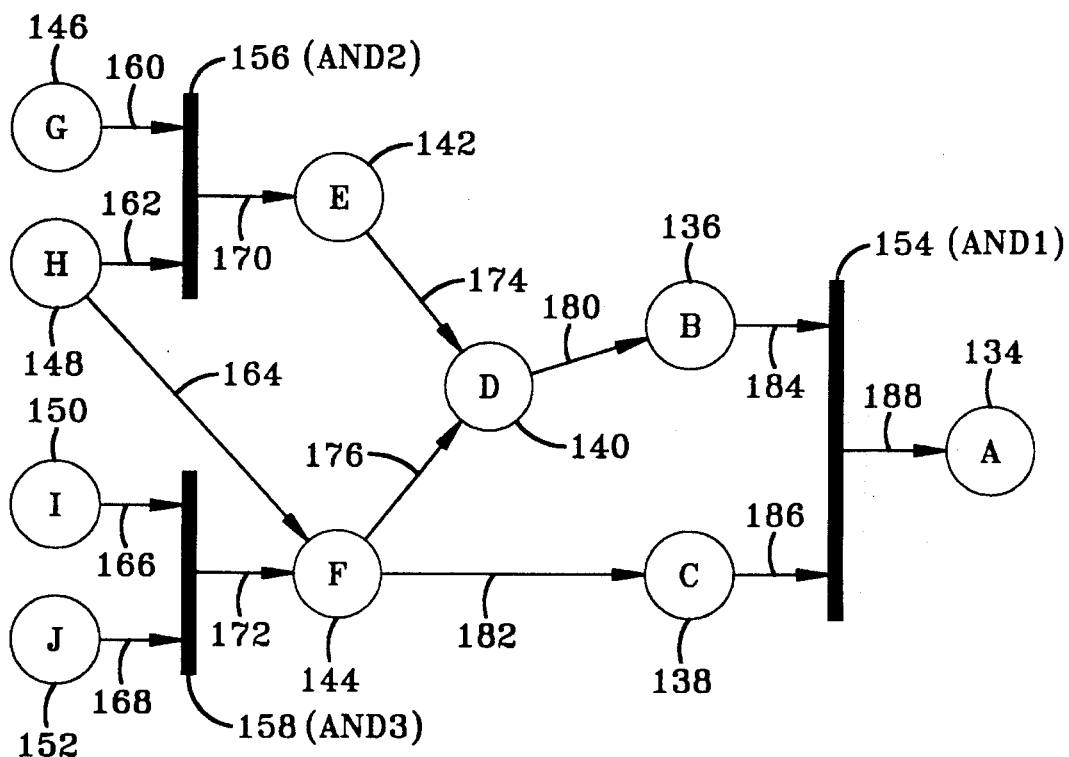
FIG. 7 is an exemplary illustration showing some of the interrelationship between doubletons, singletons and digraph AND gate objects associated with the knowledge base comprising digraph models.

Before calculating doubletons, the method of the present invention sorts the digraph AND gate objects so that each digraph AND gate object upstream will be processed before any digraph AND gate object downstream of it. This priority assignment allows the method of the present invention to propagate the doubletons that reach a digraph AND gate object from upstream nodes together with the doubletons produced from the digraph AND gate objects input nodes, rather than propagating those groups in two different operations. This priority assignment contributes to increasing the speed of response of the method of the present invention to provide solutions. A digraph model that illustrates interaction and creation between regular doubletons, doubleton candidates, and doubletons built from equivalent (equiv) nodes is illustrated in FIG. 7, comprising a plurality of nodes, AND gates, and directed edges tabulated in Table 4.

TABLE 4

| REFERENCE NO. | ELEMENT |
| --- | --- |
| 134 | Node (A) |
| 136 | Node (B) |
| 138 | Node (C) |
| 140 | Node (D) |
| 142 | Node (E) |
| 144 | Node (F) |
| 146 | Node (G) |
| 148 | Node (H) |
| 150 | Node (I) |
| 152 | Node (J) |
| 154 | AND Gate (AND 1) |
| 156 | AND Gate (AND 2) |
| 158 | AND Gate (AND 3) |
| 160 | Directed Edge |
| 162 | Directed Edge |
| 164 | Directed Edge |
| 166 | Directed Edge |
| 168 | Directed Edge |

TABLE 4-continued

| REFERENCE NO. | ELEMENT |
| --- | --- |
| 170 | Directed Edge |
| 172 | Directed Edge |
| 174 | Directed Edge |
| 176 | Directed Edge |
| 180 | Directed Edge |
| 182 | Directed Edge |
| 184 | Directed Edge |
| 186 | Directed Edge |
| 188 | Directed Edge |

For the sake of clarity, the description of FIG. 7 will refer to the reference letter designation of the nodes and omit the proper node designation which is actually digraph node objects. Further, the description of FIG. 7 will refer to the number designation (e.g., AND 1) of the AND gates and also omit the designation that the AND gates are actually digraph AND gate objects. As seen in FIG. 7, regular doubletons for AND gate (AND 1) are formed from the cross product of the doubleton candidates that are singletons of nodes B (B, F, H) and C (C, F, H). More particularly, the cross product of the doubleton candidates B, F, H and C, F, H are singletons of nodes B and C respectively. These formed cross product doubleton candidates result in the doubletons (B, C), (B, F), (B, H) (H, C) (H, F) and (F, C). The doubletons built from equivalent (equiv) nodes of the regular doubletons are (DC), (DF), (DH), (EC), (EF), and (EH) since nodes D and E are in the equivalent series terminating with node B. The nodes I and J, in particular, the cross product (IJ) forms a hidden doubleton of AND 1 since it propagates from AND 3 and reaches both nodes B and C. The nodes G and H, in particular, the cross product (GH) also forms a hidden doubleton of AND 1 since it propagates from AND 2 to node B, and enabling singleton H reaches node C. Doubletons containing nodes which are singletons of both AND gate inputs (e.g., F and H) are included for use with digraph models containing failure propagation times. In some cases, a doubleton failure may reach the output of the AND gate at a different rate than the singleton only.

Figure 8:
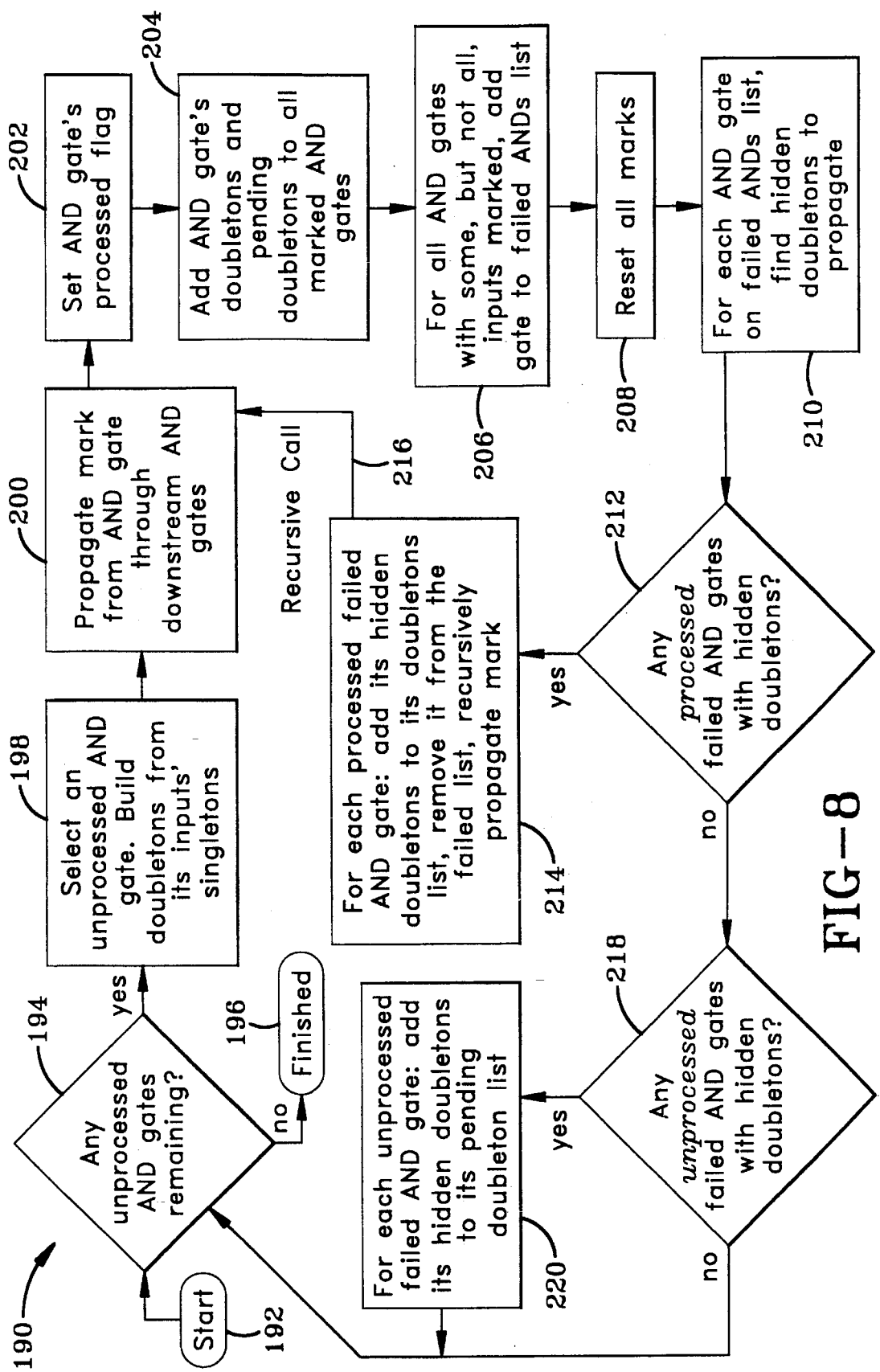
FIG. 8 is a flow chart illustrating the step-by-step sequence for calculating doubletons associated with the knowledge base of the present invention.

In general, for each digraph AND gate object, the present invention forms doubletons from digraph node objects that are singletons, as discussed with reference to FIG. 7, and propagates those doubletons, along with other doubletons that have arrived from upstream, to other downstream digraph AND gate objects via a list of downstream_andins to be further described with reference to FIG. 8. The propagation is similar to the source operation for singletons, but it only involves digraph AND gate objects and their inputs specified in their respective slot. If a mark reaches one input of a digraph AND gate object but not the other input to the same digraph AND gate object, the AND gate object is added to a list of failed ANDS and the doubletons that reach the one input is stored in the object representing the input node. This doubleton stored in an object is a partial solution and represents one of the benefits of the present invention using a method having encapsulation, inheritance and polymorphism characteristic in that this partial solution now stored in the object is to be re-accessed from the object to derive the full solution and such re-access is accomplished without any disturbance to the other portions of the solutions being determined by the method of the present invention or without any disturbance to the other (non-diagnostic) program residing and running in the computer 20.

After the propagation from a digraph AND gate object is complete, the method of the present invention checks each of the failed digraph AND gate objects to see if any of the doubletons that reached one input of the digraph AND gate object can propagate through the digraph AND gate object. This will occur if that doubleton reached the other input of the same digraph AND gate object through another path, or if a node that is a member of a digraph doubleton object (see FIG. 4(C)) is a singleton of the other input to the digraph AND gate object. These doubletons are called hidden doubletons (discussed with reference to FIG. 7) since they are not formed by the cross product of the singletons (discussed with reference to FIG. 7) of a failed (qualified) digraph AND gate object's inputs.

Representing doubletons as objects, each, as previously mentioned, stored in a memory location of the knowledge base 26 in the memory 22 of computer 20 all shown in FIG. 1, facilitates the comparison of the doubletons that reach inputs to a digraph AND gate object since the method of the present invention only needs to check if the doubleton object under consideration reached the other input of the same digraph AND gate object. Without the benefits of the present invention, in particular, if the doubletons were not represented as unique objects, an operational program (other than the present invention) would need to compare pairs of nodes from each doubleton listed in the input slot of the digraph node object to see if the doubleton members (see FIG. 4(C)) are the same as those in the doubleton being considered. Again, the principles of the present invention increase the speed of response of supplying solutions to problems.

A second way for a hidden doubleton to pass through an original digraph AND gate object, is if an enabling singleton reached the opposite input of the same digraph AND gate object. An enabling singleton is created from a node that is a member (see 94 or 96 slot of FIG. 4(C)) of the doubleton in question and, when a source operation is performed, it would allow the doubleton to pass through the digraph AND gate object by marking the other input of the same digraph AND gate object. To check for enabling singletons that reached the other input of the same digraph AND gate object, the method of the present invention marks another slot (called mark 2, not shown in FIGS. 4(A) nor 4(B)) in the digraph objects of each singleton of that other input of the same digraph AND gate object. The method of the present invention propagates those doubletons that reached the original input of the same digraph AND gate object which has one of their singleton's slots marked.

Once the method of the present invention determines which doubletons to propagate for a failed digraph AND gate object, that is, a digraph AND gate object not having both of its inputs marked, the doubleton propagation process is repeated for those doubletons. Doubletons that have already passed through the failed AND gate object are not propagated. This non-propagation prevents repeated doubletons and infinite loops. If a failed digraph AND gate object has not propagated its non-hidden doubletons yet, the new hidden doubletons are stored in a pending doubleton slot in the digraph AND gate object and are propagated with the digraph AND gate object's non-hidden doubletons. The step-by-step processing for calculating digraph doubletons may be further described with reference to FIG. 8, illustrating a plurality of programming segments, generally indicated by the reference number 190, and of the types specified in Table 5.

TABLE 5

| REFERENCE NO. | PROGRAM SEGMENT TYPE |
| --- | --- |
| 192 | Input event |
| 194 | Decisional |
| 196 | Terminal |
| 198 | Process |
| 200 | Process |
| 202 | Process |
| 204 | Process |
| 206 | Process |
| 208 | Process |
| 210 | Process |
| 212 | Decisional |
| 214 | Process |
| 216 | Feedback |
| 218 | Decisional |
| 220 | Process |

Calculating or solving for the digraph doubletons starts with event 192 that leads into the segment 194 which determines if any unprocessed AND gate objects are remaining. It should be noted, and as already discussed with reference to FIG. 6, that the start event 192 does not occur until the solutions for the singletons have been completed. If there are no unprocessed digraph AND gate objects, the calculations for the digraph doubleton is finished (196), but if the answer of decision block 194 is yes, the program sequences to segment 198. The segment 198 selects an unprocessed digraph AND gate object and builds the doubletons from the input singleton slots of the selected digraph AND gate object, in a manner as previously discussed. The segment 198 outputs its information to segment 200 which, in turn, propagates the mark from the digraph AND gate object through the digraph AND gate objects located downstream therefrom, sets (process 202) the digraph AND gate's object processed flag, and turns control over to segment 204.

Segment 204 adds the doubletons of the digraph AND gate objects, and pending doubletons, to all marked digraph AND gate objects and allows the method of the present invention to sequence to segment 206. Segment 206 determines all of the digraph AND gate objects with one input that is marked and, then, adds all these digraph AND gate objects to the failed ANDS list (all of the digraph AND gate objects having only one input marked (failed)), and then sequences to segment 208 which resets all marks and which, in turn, sequences to segment 210.

Segment 210 analyzes each digraph AND gate object on the failed ANDS list to find hidden doubletons to propagate and, then, sequences to segment 212 which determines if any processed failed digraph AND gate objects have hidden doubletons and if the answer is yes, sequences to segment 214, but if the answer is no, sequences to decisional block 218. The segment 214 analyzes each processed failed digraph AND gate object and adds its hidden doubletons to the doubleton list, removes the failed digraph AND gate from failed list, and recursively propagates the related mark which, in turn, requests a recursive call message 216 which is inputted to segment 200 which, in turn, causes segments 202, 204, 206, 208, 210 and 212 to be repeated.

If the answer of decision block 212 is no, that is, the processed failed AND gates did not have hidden doubletons, segment 218 is activated. Segment 218 determines if any non-processed failed digraph AND gate objects have hidden doubletons and if the answer is no, the process returns to the initial decision block 194 which proceeds to process any unprocessed AND gates, but if the answer is yes, decision block 218 sequences to segment 220.

The segment 220 determines each unprocessed failed AND gate objects and adds its hidden doubletons to its pending doubleton list and then allows control to be returned to the initial decisional block 194.

Results Yielded by the Method of the Present Invention

After all the singletons have been processed and after all the doubletons from each digraph AND gate object have been propagated, the diagnostic solution employing reliability digraph models has been completed. More particularly, with reference again to FIG. 1, after data sample signals indicative of the operation of each of the plurality of units making up complex system 12 of FIG. 1 have been analyzed, in a manner known in the art, to determine if any failure of these units has occurred and those failures are represented in the digraph model, in particular, then the method of the present invention determines if any predetermined target events have occurred. The failure signals are routed to the computer 20 having access to the knowledge base 26 comprising the digraph model having objects representative of nodes, AND gates and doubletons, which are handled or processed to come up with a solution by an operation having encapsulation, inheritance and polymorphism characteristics. The operation with these characteristics is also self-contained having the further benefit of reducing the number of accesses to memory which, advantageously reduces the processing time to come up with a solution. The knowledge base 26 assigns a particular digraph node object for each unit which represents a failure of that assigned unit. Upon the occurrence of a failure condition of the assigned unit, a target event will or will not be detected, dependent upon the predetermined digraph model arranged in the knowledge base 26 and the predetermined conditions needed to qualify the target event. As discussed hereinbefore, the solutions of singletons and doubletons execute or allow the failure of the unit to propagate to a target event or not allow this failure to propagate to a target event. If such a target event occurs, it is recognized by the method of the present invention and printed out on printer 30 or on the graphic display 28 both shown in FIG. 1.

To print out the singletons of a given node object, the operating programs of the method of the present invention may print the names (ID - see FIG. 4) of the nodes stored in the singleton slot of the digraph node object and the names of the equivalent (equiv) nodes of each of those stored singletons. To print out the doubletons for a particular digraph node object or for a particular AND gate object, the present invention prints the names of the nodes in the digraph doubleton object from each of the digraph AND gate objects directly upstream of the node (listed in the upstream_ands slot of the digraph node object). For each doubleton object listed in an upstream digraph gate object, the cross product of the nodes equivalent to the doubleton candidate nodes listed in the doubleton object is calculated. The results of this cross product are doubletons represented by that digraph doubleton object. Once a doubleton is printed for a digraph node object, its object is marked so that it will not be printed twice for that same digraph node object. The method of the present invention finds and prints the singletons and doubletons for every node in the digraph model. When the method of the present invention is used with a graphic user, the results are preferably displayed with colors on a graphic depiction of the digraph model or even along with the system schematic of system 12 correlating the failure to its assigned unit of the complex system 12.

Application for the Method of the Present Invention

The method of the present invention provides a considerable increase in the processing speed when compared with the system techniques described in the "Background" section. This performance increase is substantial. For example, for a complex system 12 having a number of nodes of about 7271, each corresponding to a particular unit and its associated failure, the processing time for digraph model reliability and diagnostic analysis was reduced from 4 days to 14 seconds. This increase in processing time provided by the present invention creates a wide variety of possible applications for the present invention. For example, system designers can experiment with reliability models for new designs without waiting hours for test results. The method of the present invention can be used to test full scenarios for a deployed system by introducing faults into the digraph model and evaluating the resulting digraph solution provided by the method of the present invention. The present invention by providing faster digraph evaluation also allows automatic diagnostic systems using digraph models to provide a relatively quick response when called upon to provide a solution in a dynamic operating environment.

It should now be appreciated that the practice of the present invention provides for digraph reliability models that also provide for diagnostic analysis of complex systems, such as the space station of NASA which tends to be very large and complex. The method of the present invention reduces the processing time for digraph models of complex systems from days to minutes and even seconds. This reduction speeds up the operational response allowing for the digraph models to be used in automatic monitoring and diagnostics of complex systems.

Further, although the invention has been described relative to specific embodiments thereof, it is not so limited and many modifications and variations thereof now will be readily apparent to those skilled in the art in light of the above teachings.

What we claim is:

1. A method of testing and predicting failures of electronic and mechanical systems each comprising a plurality of units, said method comprising the steps of:

(a) receiving data samples indicative of the operating status of each of said plurality of units of said system;

(b) analyzing said data samples to determine any failures of any of said plurality of units and generating respective failure signals thereof;

(c) directing said failure signals to a digital computer having a memory for storing a knowledge base comprising objects separately stored in memory and each object having a plurality of slots, said knowledge base having encapsulation, inheritance and polymorphism characteristics, said knowledge base further comprising a digraph model that determines predetermined target events and comprises nodes and AND gates that are connected by directed edges, each of said nodes corresponding to a particular failure of said plurality of units and each of said AND gates having a plurality of inputs, said nodes and AND gates being connected by the directed edges so that propagation therebetween and exit therefrom determines said target events, said propagation being determined by executable singletons and doubletons, each of said nodes, said AND gates and said doubletons being assigned as an individual object in memory;

(d) classifying said failure signal as one of said singletons and doubletons and generating singleton and doubleton failure signals therefor;

(e) identifying said singleton generated failure signal with its respective node, then delivering said node identification to its object and monitoring for the occurrence of its respective predetermined target event; and (f) identifying said doubleton generated failure signal with its respective node as well as its own identity and delivering said node identification to its object and said doubleton identification to its object, and monitoring for the occurrence of any predetermined target event.

2. A method of testing and predicting failures of electronic and mechanical systems each comprising a plurality of units, said method comprising the steps of:

(a) receiving data samples indicative of the operating status of each of said plurality of units of said system;

(b) analyzing said data samples to determine any failures of any of said plurality of units and generating respective failure signals thereof;

(c) directing said failure signals to a digital computer having a memory for storing a knowledge base comprising objects separately stored in memory and each object having a plurality of slots, said knowledge base having encapsulation, inheritance and polymorphism characteristics, said knowledge base further comprising a digraph model that determines predetermined target events and comprises nodes and AND gates that are connected by directed edges, each of said nodes corresponding to a particular failure of said plurality of units and each of said AND dates having a plurality of inputs, said nodes and AND gates being connected by the directed edges so that propagation therebetween and exit therefrom determines said target events, said propagation being determined by executable singletons and doubletons, each of said nodes, said AND gates and said doubletons being assigned as an individual object in memory;

(d) classifying said failure signal as one of said singletons and doubletons and generating singleton and doubleton failure signals therefor, said step of classifying said failure signals and generating said singleton signal further comprises the steps of:

(i) marking one of said plurality of slots of said node of said object of said respective failed node as failed; and (ii) identifying other nodes that said marked node propagates thereto by way of said directed edges and marking said other propagated nodes as failed in one of said plurality of slots of said objects of each of said other propagated nodes; and (iii) monitoring for the occurrence of any target events;

(e) identifying said singletons generated failure signal with its respective node, then delivering said node identification to its object and monitoring for the occurrence of its respective predetermined target event; and (f) identifying said doubleton generated failure signal with its respective node as well as its own identity and delivering said node identification to its object and said doubleton identification to its object, and monitoring for the occurrence of any predetermined target event.

3. The method of testing and predicting failures of electronic and mechanical systems according to claim 2 further comprising the step of identifying said propagated nodes that are reached by said directed and propagating edges as being inputs to one of a group consisting of an AND gate object and a multiple output node object and then marking one of said slots of one or more respective node objects that are reached by said directed and propagating edges as an object which is equivalent to said objects of said group.

4. The method of testing and predicting failures of electronic and mechanical systems according to claim 3, wherein said step of classifying and generating said doubleton failure signal further comprises the steps of:

(a) analyzing each failure node to determine if its directed edge is connected to an input of an AND gate object and also determining if a failure node object has been marked as an equivalent node;

(b) constructing doubletons for each AND gate object by determining a cross product singleton node objects each of which cross product being an input of said AND gate object analyzed in step 4(a);

(c) creating a unique said doubleton object for at least two cross product inputs to said constructed AND gate object;

(d) sorting said AND gate objects into upstream and downstream AND gate objects and giving priority to said sorted upstream AND gate objects over said downstream AND gate objects in the processing involved with testing and predicting of failures;

(e) propagating said AND gate objects having an input which has its object marked as equivalent to form a downstream_andins list;

(f) checking said downstream_andins list to determine if any associated AND gate objects have been qualified and if any target events has been generated;

(g) checking said AND gate objects which have their object marked as being an equivalent object to determine if the objects marked as equivalent propagate through said qualified AND gates and classifying such AND gate objects as hidden doubletons; and (h) repeating steps (b) through (g) for said hidden doubletons.

* * * * *